(12) United States Patent
Oh

(10) Patent No.: US 7,806,245 B2
(45) Date of Patent: Oct. 5, 2010

(54) CLUTCH SYSTEM

(75) Inventor: Wonseok Oh, Incheon (KR)

(73) Assignee: Hyundai Motor Company, Seoul (KR)

( * ) Notice: Subject to any disclaimer, the term of this patent is extended or adjusted under 35 U.S.C. 154(b) by 383 days.

(21) Appl. No.: 11/950,685

(22) Filed: Dec. 5, 2007

(65) Prior Publication Data
US 2009/0057087 A1 Mar. 5, 2009

(30) Foreign Application Priority Data
Sep. 3, 2007 (KR) .................. 10-2007-0089194

(51) Int. Cl.
*F16D 25/0638* (2006.01)
*F16D 13/72* (2006.01)
(52) U.S. Cl. .............. 192/70.12; 192/70.14; 192/85.24; 192/85.61; 192/113.34
(58) Field of Classification Search ................ 192/52.3, 192/70.14, 107 C
See application file for complete search history.

(56) References Cited

U.S. PATENT DOCUMENTS 1,132,958 A * 3/1915 Miller ..................... 192/70.12
2,256,698 A * 9/1941 Wolfram .................. 192/107 C
2,927,673 A * 3/1960 Sand ........................ 192/70.14
5,813,508 A * 9/1998 Shoji et al. ............. 192/113.34

FOREIGN PATENT DOCUMENTS

| EP | 0 625 647 A1 | 11/1994 |
|---|---|---|
| KR | 10-0319329 B1 | 3/2002 |
| KR | 10-2006-0003759 A | 1/2006 |

* cited by examiner

*Primary Examiner*—Richard M. Lorence
(74) *Attorney, Agent, or Firm*—Morgan, Lewis & Bockius LLP

(57) ABSTRACT

A clutch system selectively transmitting torque in an automatic transmission according to an exemplary embodiment of the present invention may include: a rotation axis rotated by the torque; at least one plate disposed at an exterior of the rotation axis and moved along an axial direction of the rotation axis; at least one disk alternately disposed with the plate and moved along the axial direction of the rotation axis, the disk having at least one wave along a radial direction thereof; and a piston applying force to the disk and the plate along the axial direction of the rotation axis such that a frictional force is generated between the plate and the disk. Therefore, the clutch system of this invention has advantages of enhanced durability and operability.

6 Claims, 4 Drawing Sheets

CLUTCH SYSTEM

CROSS-REFERENCE TO RELATED APPLICATION

This application claims priority to and the benefit of Korean Patent Application No. 10-2007-0089194, filed in the Korean Intellectual Property Office on Sep. 3, 2007, the entire contents of which are incorporated herein by reference.

BACKGROUND OF THE INVENTION (a) Field of the Invention

The present invention relates to a clutch system that selectively transmits torque in an automatic transmission. More particularly, the present invention relates to a clutch system having enhanced operability and durability.

(b) Description of the Related Art

Generally, at least one clutch is disposed in an automatic transmission, and each clutch is selectively operated at respective speeds in order to change a gear ratio.

That is, when an input torque is applied to at least one input element of the automatic transmission, the input torque is selectively transmitted to another operation element by operation of the clutch. In this process, rotation speed of the input speed is changed to a targeted rotation speed, and the targeted rotation speed is outputted through an output element.

Operation of an automatic transmission is well-known to a person of ordinary skill in the art, and thus a detailed description thereof will be omitted.

The clutch receives torque from the rotation axis, and the torque is sequentially transmitted to clutch disks, plates, and a retainer in the clutch.

Clutch disks and plates can be moved along an axial direction of the rotation axis, and are selectively contacted with each other by operation of a piston.

In addition, automatic transmission fluid flows in the clutch in order to cool the clutch, and is exhausted between the disks and the plates.

However, since a conventional clutch has waves only along a circumferential direction thereof, cooling performance of the clutch disk deteriorates when the clutch rotates.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a clutch system having advantages of enhanced cooling performance and facilitating clutch disks being detached from plates in a non-operating state of the clutch system.

A clutch system selectively transmitting torque in an automatic transmission according to an exemplary embodiment of the present invention may include: a rotation axis rotated by the torque; at least one plate disposed at an exterior of the rotation axis and moved along an axial direction of the rotation axis; at least one disk alternately disposed with the plate and moved along the axial direction of the rotation axis, each disk having at least one wave along a radial direction thereof; and a piston applying force to the disk and the plate along the axial direction of the rotation axis such that a frictional force is generated between the plate and the disk.

The clutch system according to the exemplary embodiment of the present invention may further include a hub integrally rotating with the rotation axis and splined with the disk such that the disk is moved along the axial direction of the rotation axis.

At least one intake oil hole may be formed at the hub, and automatic transmission fluid flows in the clutch system through the intake oil hole.

A retainer splined with the distal ends of the plates may be disposed at an exterior of the plate, and at least one exhaust oil hole for exhausting the automatic transmission fluid may be formed at the retainer.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
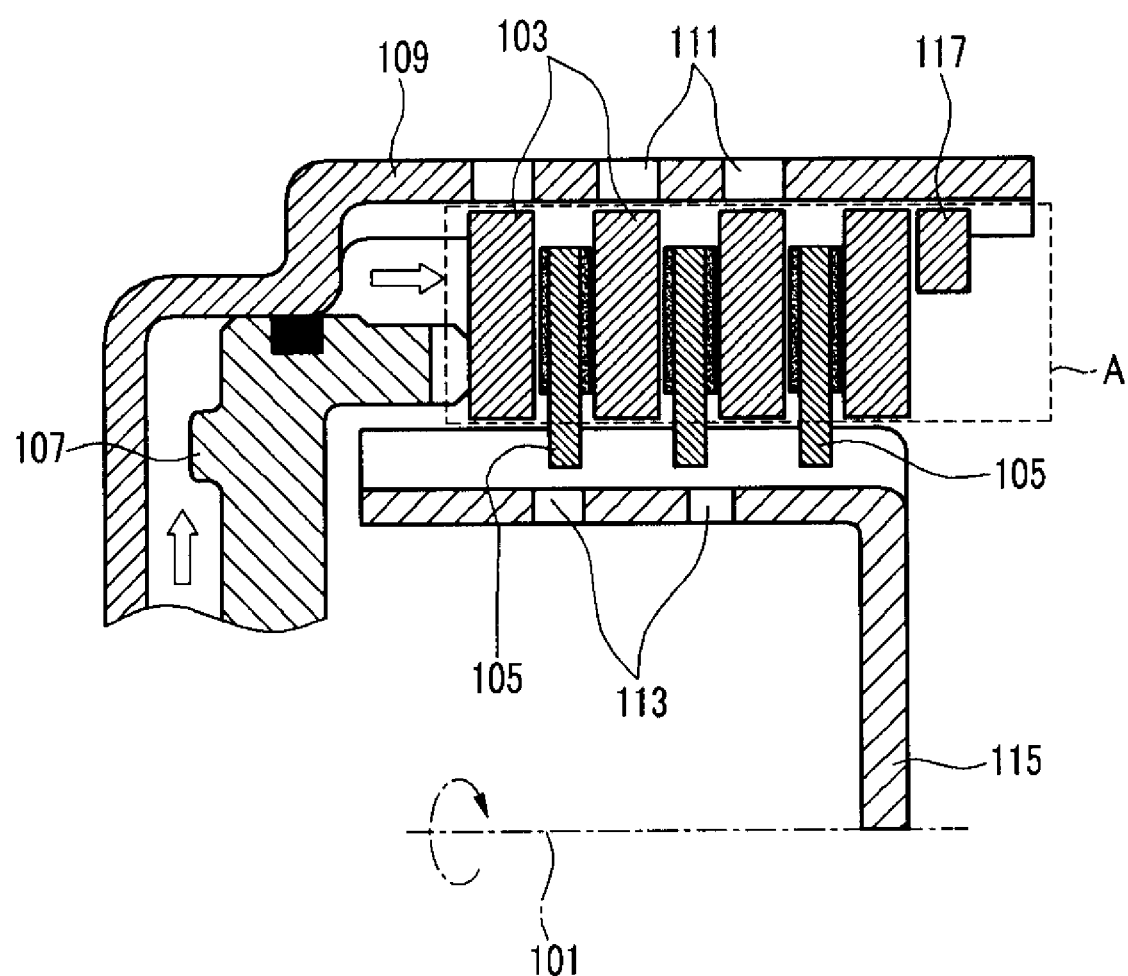
FIG. 1 and FIG. 2 are cross-sectional views of a clutch system according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 2:
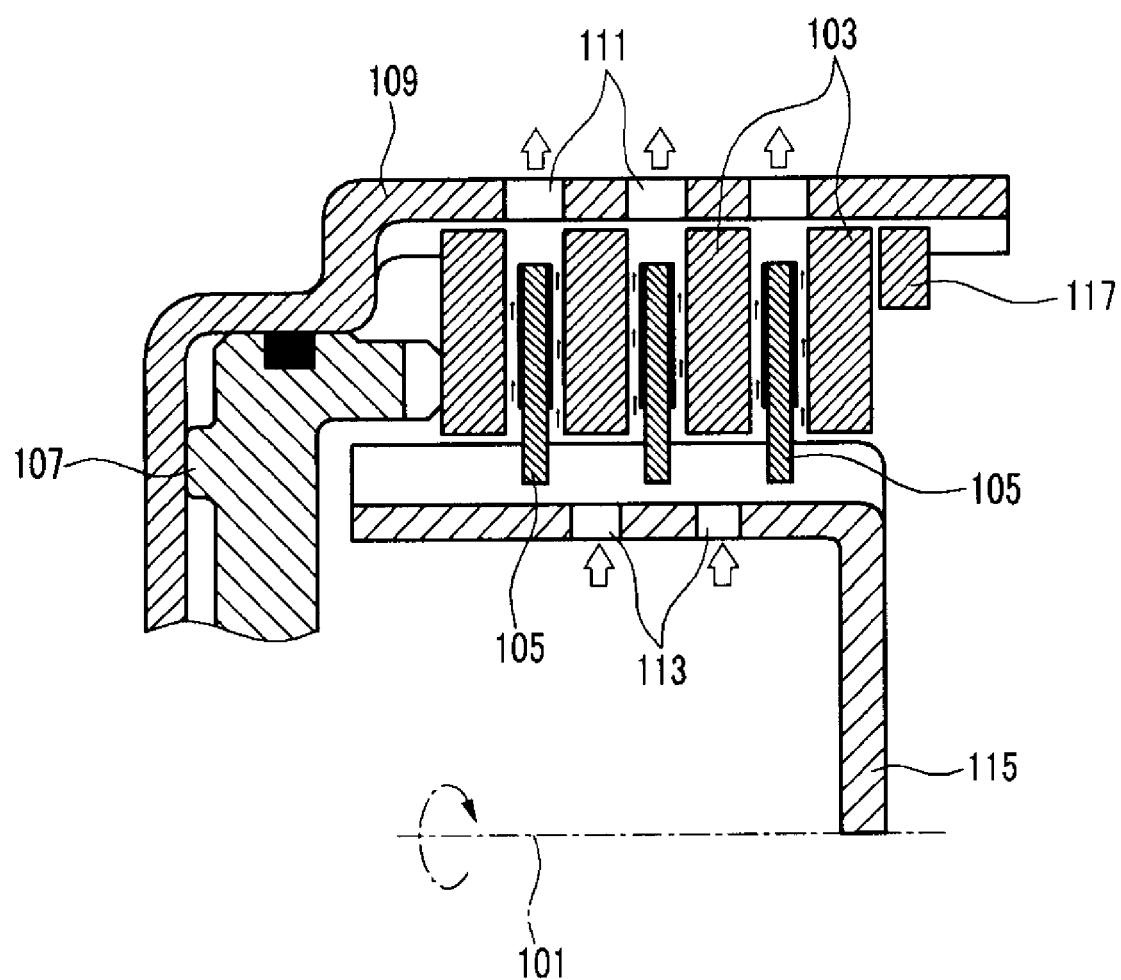
Figure 3:
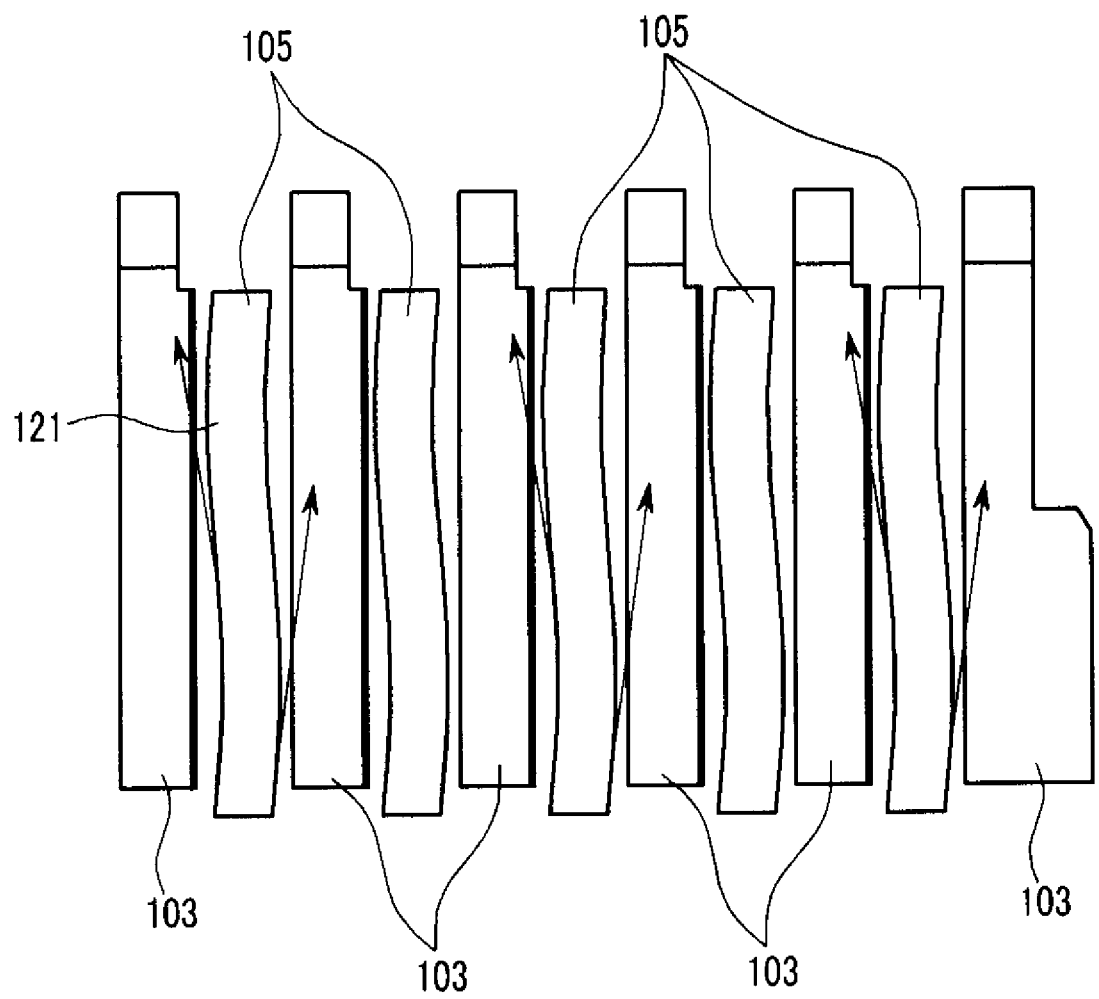
FIG. 3 is an enlarged view of the "A" region of the clutch system shown in FIG. 1.
Figure 4:
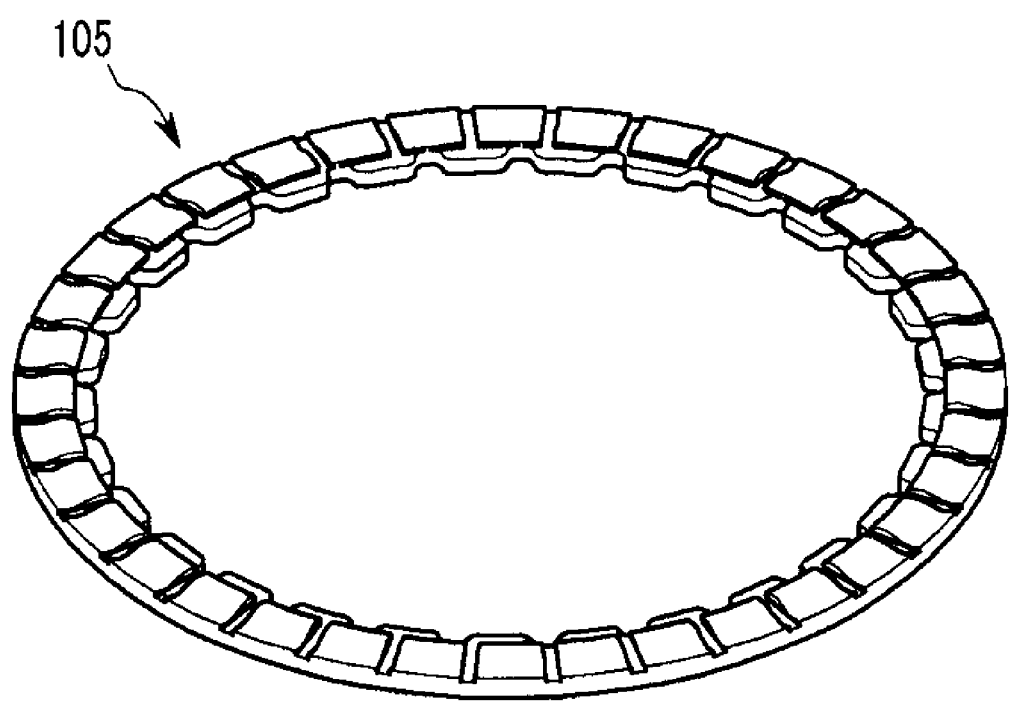
FIG. 4 is a schematic diagram showing disks of a clutch system according to an exemplary embodiment of the present invention.

FIG. 1 and FIG. 2 are cross-sectional views of a clutch system according to an exemplary embodiment of the present invention, FIG. 3 is an enlarged view of the "A" region of the clutch system shown in FIG. 1, and FIG. 4 is a schematic diagram showing disks of a clutch system according to an exemplary embodiment of the present invention.

As shown in FIG. 1 and FIG. 2, a clutch system according to an exemplary embodiment of the present invention selectively transmits torque in an automatic transmission. The clutch system includes a rotation axis 101, at least one plate 103, at least one disk 105, and a piston 107.

The rotation axis 101 is rotated by engine torque. Each plate 103 is disposed at an exterior of the rotation axis 101 and can be moved along an axial direction of the rotation axis 101.

Each disk 105 is alternately disposed with each plate 103 and can be moved along the axial direction of the rotation axis 101. At least one wave 121 is formed at the disks 105 along a radial direction thereof.

The piston 107 applies force to the plates 103 and the disks 105 along the axial direction of the rotation axis 101 such that frictional force is generated between the plates 103 and the disks 105.

The clutch system according to the exemplary embodiment of the present invention integrally rotates with the rotation axis 101. The clutch system further includes a hub 115. The disks 105 are splined to the hub 115 such that the disks 105 are moved along the axial direction of the rotation axis 101.

That is, when the piston 107 is moved in the axial direction of the rotation axis (referring to arrows in FIG. 1), the hub 115 and the disks splined thereto are rotated by an torque input to the automatic transmission, and the disks 105 and the plates 103 are contacted with each other. Therefore, the plates 103 are rotated.

FIG. 2 shows the clutch system before the piston 107 is moved, and FIG. 1 shows the clutch system in the right direction after the piston 107 is moved along the axial direction of the rotation axis 101.

FIG. 3 is an enlarged view of the "A" region of the clutch system shown in FIG. 1.

Referring to FIG. 3, the disks 105 have at least one wave 121 along a radial direction thereof to increase the cooling performance of the clutch when the clutch rotates.

At least one intake oil hole 113 is formed around the hub 115. Automatic transmission fluid (ATF) flows in the clutch system through the intake oil holes 113.

The automatic transmission fluid cools the clutch system in the automatic transmission. The automatic transmission fluid is well known to a person of ordinary skill in the art, and thus a detailed description thereof will be omitted.

The plates 103 are splined to the inner portion of a retainer 109 disposed at an exterior portion of the plates 103, and at least one exhaust hole 111 is formed around the retainer 109. The automatic transmission fluid is exhausted through the exhaust oil holes 111.

That is, the automatic transmission fluid flows in the clutch system through the intake oil holes 113, flows between the disks 105 and the plates 103, and is exhausted through the exhaust oil holes 111 (referring to arrows in FIG. 2).

When the plates 103 are rotated by the frictional force between the plates 103 and the disks 105, the retainer 109 is also rotated. As a result, the torque is transmitted by the clutch system when the retainer 109 is rotated.

When the piston 107 moves along the axial direction, a stopper 117 restricts axial movement of the plates 103.

In the exemplary embodiment of the present invention, when the piston 107 applies force to the plates 103, the waves 121 formed in the disks 105 are flattened and thus the plates 103 is pressured in a longitudinal direction of the clutch system to push out the heated automatic transmission fluid between the waves 121 in the radial direction of the plates 103. Thus, the pressured automatic transmission fluid may be easily exhausted through the exhaust oil holes 111.

Therefore, cooling performance and durability of the disks 105 may be enhanced according to the exemplary embodiment of the present invention since the heated automatic transmission fluid is fast replaced with the newly-supplied cold automatic transmission fluid.

In addition, when the piston 107 is moved to the left direction as shown in FIG. 2 and the disks 105 are detached from the plates 103, the disks 105 may be easily detached from the plates 103 due to the restoring force of the disk 105 which occurs when the wave of the disk 105 recovers from the elastic deformation.

Therefore, drag torque between the disks 105 and the plates 103 may be reduced.

According to the present invention, cooling performance may be improved. Therefore, durability and operability may be improved.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A clutch system selectively transmitting torque in an automatic transmission, comprising:
    a retainer;
    at least one disk having a rotation axis rotated by the torque, moved along the axial direction of the rotation axis, the at least one disk having at least one wave along a radial direction of the rotation axis thereof;
    at least one plate wherein a distal end of the at least one plate is disposed at an interior of the retainer, alternately disposed with the at least one disk and moved along the axial direction of the rotation axis; and
    a piston applying force to the at least one disk and the at least one plate along the axial direction of the rotation axis such that a frictional force is generated between the at least one plate and the at least one disk.

2. The clutch system of claim 1, further comprising a hub integrally rotating with the rotation axis wherein a proximate end of the at least one disk is splined around the hub so that the at least one disk is moved along the axial direction of the rotation axis by the piston.

3. The clutch system of claim 2, wherein at least one intake oil hole is formed around the hub, and automatic transmission fluid flows in the clutch system through the intake oil hole.

4. The clutch system of claim 1, wherein the retainer is splined with the distal end of the at least one plate, and includes at least one exhaust oil hole for exhausting the automatic transmission fluid around the retainer.

5. The clutch system of claim 1, wherein the at least one disk is slidably coupled to a hub integrally rotating with the rotation axis so that the at least one disk is moved along the axial direction of the rotation axis by the piston, and wherein the at least one plate is slidably coupled to the retainer.

6. The clutch system of claim 1, wherein the at least one wave is formed in a sinusoid shape along the radial direction of the rotation axis.

* * * * *